(12) United States Patent
Briseno

(10) Patent No.: US 11,221,278 B2
(45) Date of Patent: Jan. 11, 2022

(54) SAMPLE COLLECTION DEVICE

(71) Applicant: Omar Briseno, Corpus Christi, TX (US)

(72) Inventor: Omar Briseno, Corpus Christi, TX (US)

( * ) Notice: Subject to any disclaimer, the term of this patent is extended or adjusted under 35 U.S.C. 154(b) by 246 days.

(21) Appl. No.: 16/541,556

(22) Filed: Aug. 15, 2019

(65) Prior Publication Data

US 2021/0048375 A1 Feb. 18, 2021

(51) Int. Cl.
*G01N 1/12* (2006.01)
*G01N 1/40* (2006.01)

(52) U.S. Cl.
CPC ............ *G01N 1/12* (2013.01); *G01N 1/4077* (2013.01); *G01N 2001/4088* (2013.01)

(58) Field of Classification Search
CPC .............. G01N 1/12; G01N 1/4077; G01N 2001/4088; G01N 33/18; B25J 1/04
See application file for complete search history.

(56) References Cited

U.S. PATENT DOCUMENTS

| | | | | |
|---|---|---|---|---|
| 3,675,491 A | * | 7/1972 | Guillet | G01N 1/08 73/864.63 |
| 3,960,021 A | * | 6/1976 | Jones | G01N 1/12 73/864.51 |
| 4,061,038 A | * | 12/1977 | Clarke, Jr. | G01F 19/00 73/427 |
| 4,378,026 A | | 3/1983 | Bauer | |
| 4,548,088 A | | 10/1985 | Hood, Jr. | |
| 4,869,118 A | * | 9/1989 | Keller | G01N 1/12 73/864.63 |
| 5,442,970 A | * | 8/1995 | Hutchins | G01N 1/12 73/864.63 |
| 5,601,324 A | * | 2/1997 | Purcell | G01N 1/12 294/104 |
| 7,014,231 B1 | * | 3/2006 | Callen | E04H 4/14 294/181 |
| 2002/0179794 A1 | | 12/2002 | Yang | |
| 2006/0005639 A1 | * | 1/2006 | Feller | G01N 1/12 73/863.23 |
| 2008/0098827 A1 | | 5/2008 | Campbell | |
| 2009/0155127 A1 | | 6/2009 | Kopoian | |
| 2016/0089118 A1 | | 3/2016 | Petersilia | |
| 2018/0202180 A1 | * | 7/2018 | Baker | E04H 4/148 |
| 2020/0240164 A1 | * | 7/2020 | Capps | E04H 4/16 |

\* cited by examiner

*Primary Examiner* — Natalie Huls

(57) ABSTRACT

A sample collection device for extended reach sampling includes a rod and a cup, which is selectively couplable to a first end of the rod. The rod is configured to be grasped, proximate to a second end, in a hand of a user, positioning the user to position the cup in a source stream to collect a sample.

14 Claims, 5 Drawing Sheets

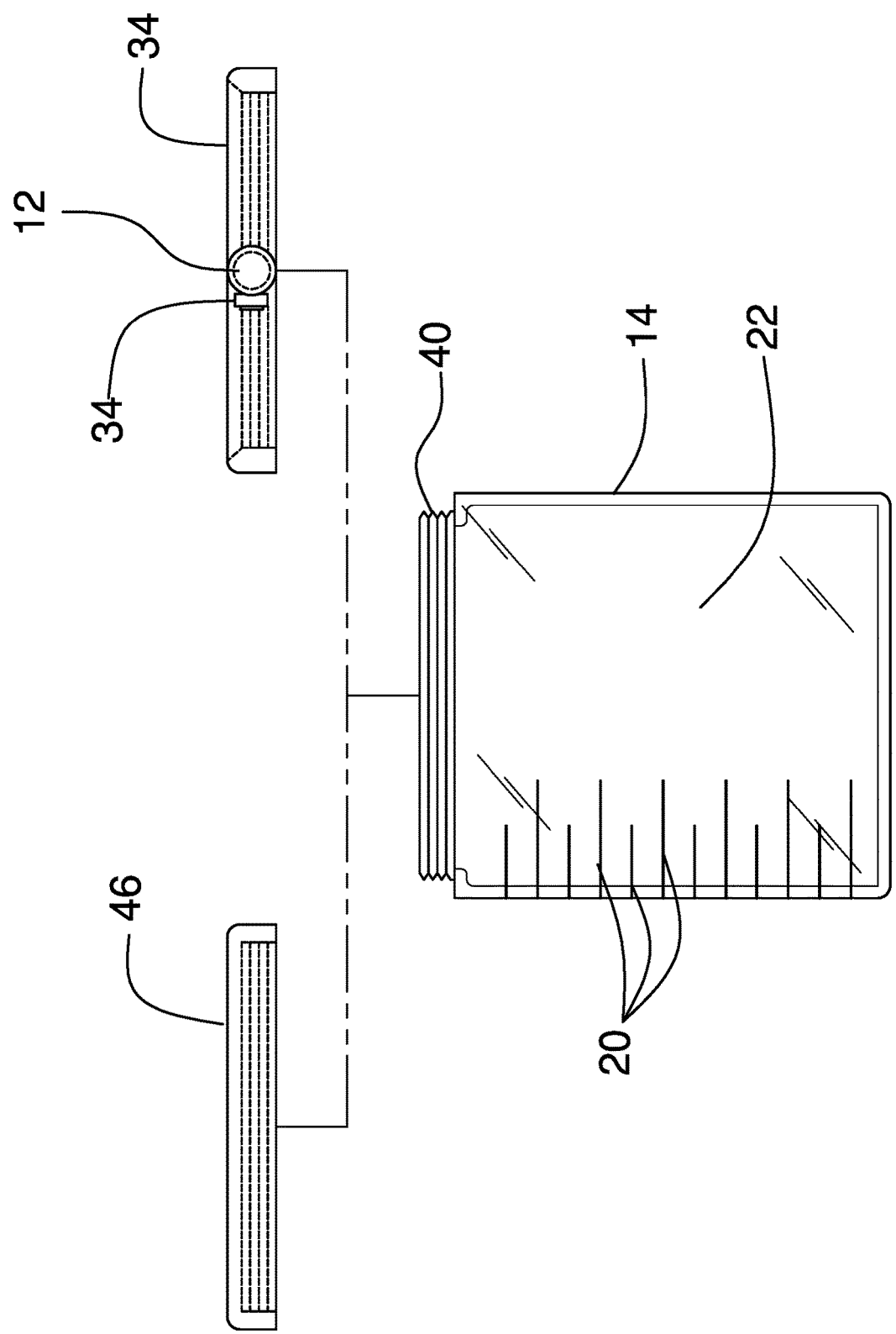

SAMPLE COLLECTION DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relate to collection devices and more particularly pertain to a new collection device for extended reach sampling.

BRIEF SUMMARY OF THE INVENTION

An embodiment of the disclosure meets the needs presented above by generally comprising a rod and a cup, which is selectively couplable to a first end of the rod. The rod is configured to be grasped, proximate to a second end, in a hand of a user, positioning the user to position the cup in a source stream to collect a sample.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 5 is an end view of an embodiment of the disclosure.

DETAILED DESCRIPTION OF THE INVENTION

Figure 1:
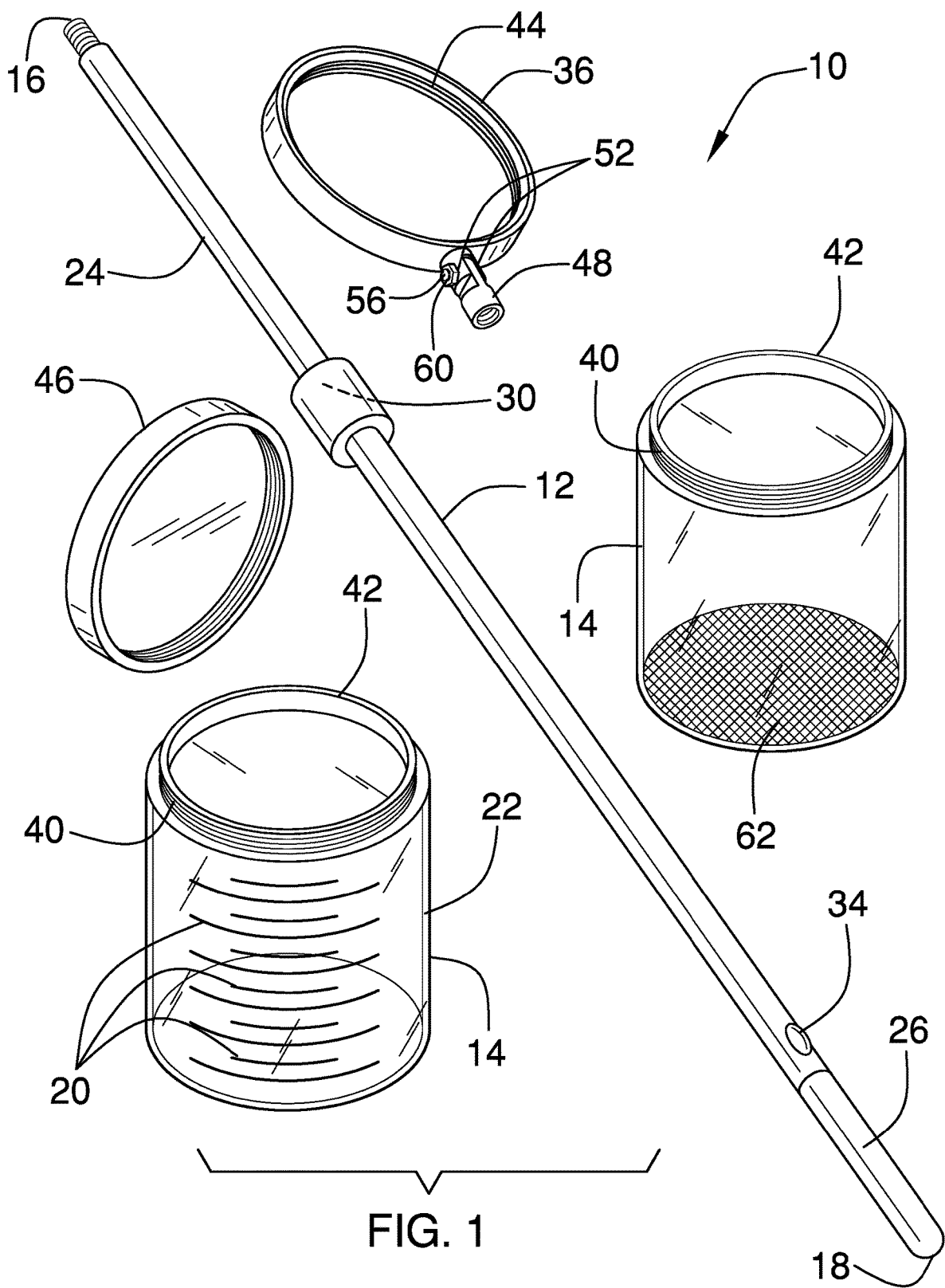
FIG. 1 is an exploded view of a sample collection device according to an embodiment of the disclosure.

With reference now to the drawings, and in particular to FIGS. 1 through 5 thereof, a new collection device embodying the principles and concepts of an embodiment of the disclosure and generally designated by the reference numeral 10 will be described.

As best illustrated in FIGS. 1 through 5, the sample collection device 10 generally comprises a rod 12 and a cup 14, which is selectively couplable to a first end 16 of the rod 12. The rod 12 is configured to be grasped, proximate to a second end 18, in a hand of a user, positioning the user to position the cup 14 in a source stream to collect a sample. The device 10 is anticipated to be useful in fulfilling the sampling requirement in a variety of fields, including, but not limited to, water purification and treatment, oil extraction and processing, and the like.

The cup 14 is cylindrically shaped and is substantially transparent. Indicia 20 that are positioned on a wall 22 of the cup 14 are configured to indicate a volume of the sample within the cup 14.

Figure 3:
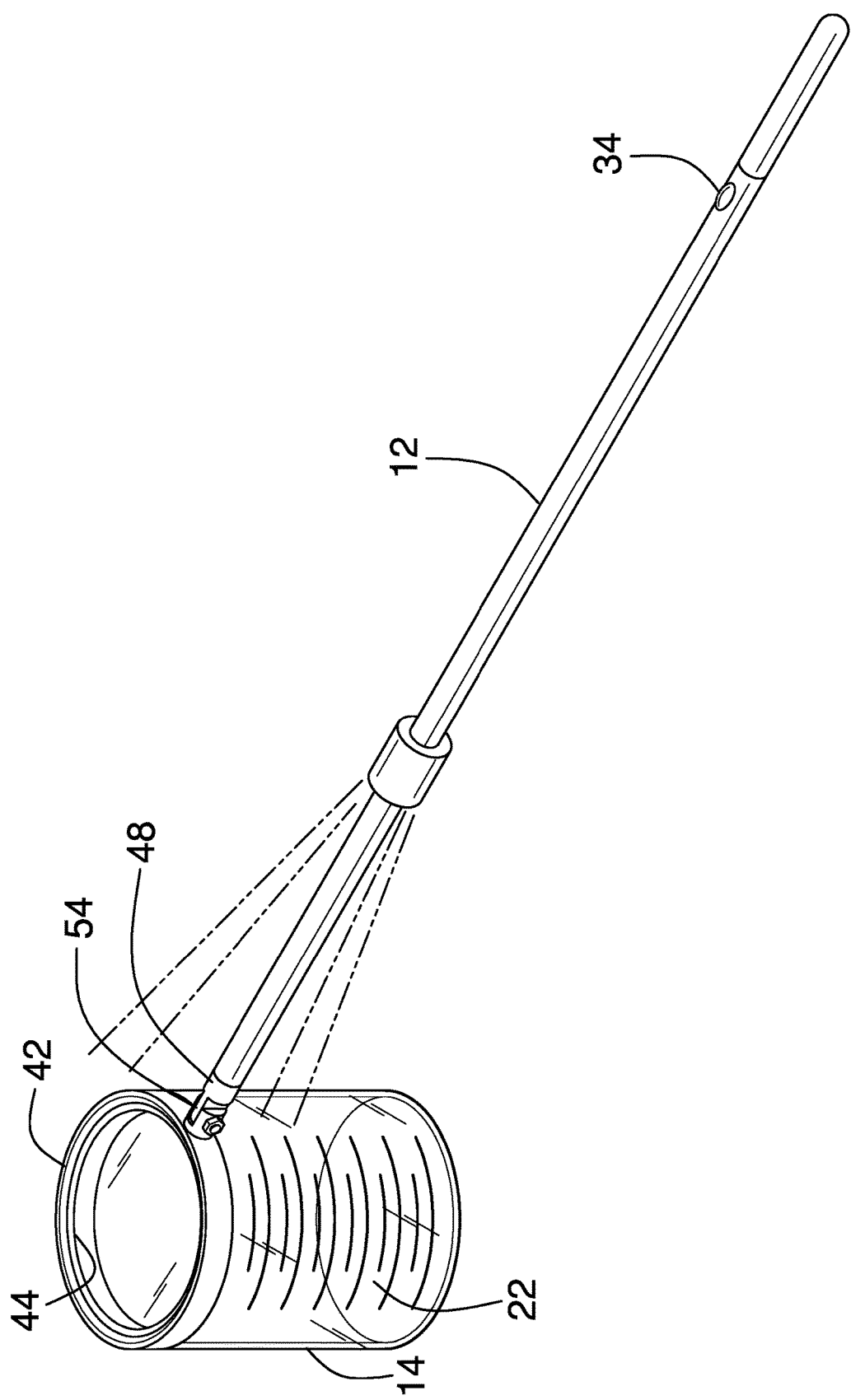
FIG. 3 is an isometric perspective view of an embodiment of the disclosure.

The rod 12 comprises a first section 24 that is selectively couplable to a second section 26. The second section 26 is tubular. A power module 28 is coupled to and is positioned in the second section 26 of the rod 12. The power module 28 comprises a battery 64. A bulb 30 that is coupled to the rod 12 proximate to the first end 16 is operationally coupled to the power module 28 so that the power module 28 is positioned to selectively power the bulb 30. The bulb 30 is configured to illuminate an area proximate to the cup 14 and facilitates use of the device 10 in low ambient light environments, as depicted in FIG. 3. The bulb 30 comprises a light emitting diode 32.

A switch 34 that is coupled to the first section 24 of the rod 12 proximate to the second section 26 is operationally coupled to the power module 28 and the bulb 30. The switch 34 is configured to be selectively switched to operationally couple the bulb 30 to the power module 28 to illuminate the area proximate to the cup 14. The switch 34 may push button type, but also may be of other types, such as, but not limited to, slide type, toggle type, and the like.

Figure 4:
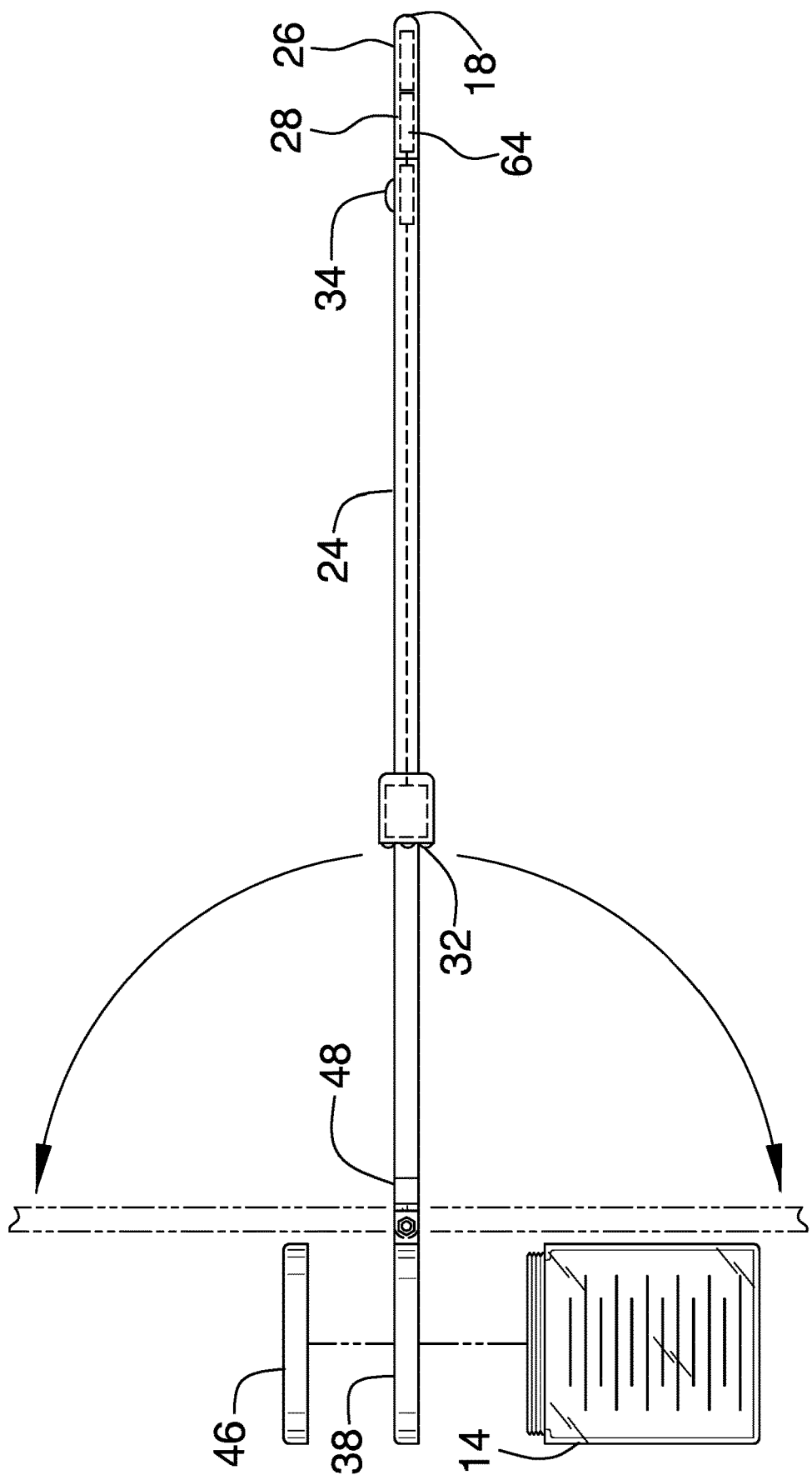
FIG. 4 is a side view of an embodiment of the disclosure.

A fastener 36 that is coupled to the first end 16 of the rod 12 is positioned to selectively couple to the cup 14 to removably couple the cup 14 to the rod 12. The fastener 36 may comprise a ring 38 that is pivotally coupled to the rod 12, or other type of fastening means, such as, but not limited to, straps, clamps, and the like. The rod 12 is configured to be pivoted relative to the ring 38, as shown in FIG. 4, so that the cup 14 is selectively positionable to collect a sample from a source stream that is lower than or above the user.

External threading 40 is positioned on the cup 14 proximate to an upper end 42 of the cup 14, as shown in FIG. 5. Internal threading 44 that is positioned in the ring 38 is complementary to the external threading 40 so that the ring 38 is positioned to threadedly insert the cup 14 to removably couple the cup 14 to the ring 38. A lid 46 is selectively threadedly couplable to the upper end 42 of the cup 14 to sealably enclose the sample within the cup 14.

Figure 2:
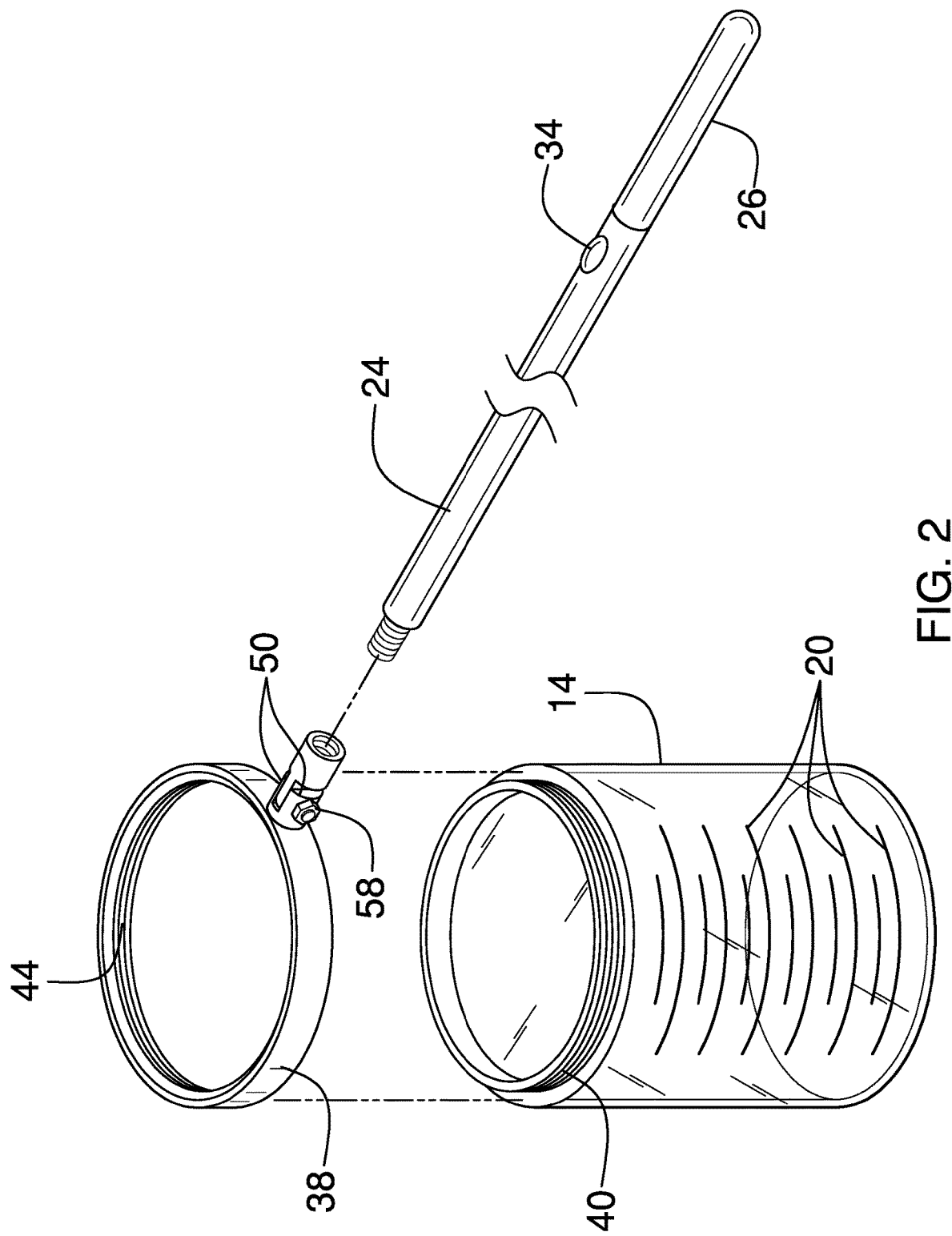
FIG. 2 is an isometric perspective view of an embodiment of the disclosure.

The rod 12 is externally threaded adjacent to the first end 16, as shown in FIG. 2. A tube 48 is pivotally coupled to and extends from the ring 38. The tube 48 is internally threaded so that the tube 48 is positioned to threadedly insert the first end 16 of the rod 12 to removably couple the rod 12 to the ring 38.

A pair of tabs 50 is coupled to and extends from the ring 38. Each of a pair of holes 52 is positioned in a respective tab 50. A channel 54 extends through the tube 48 so that the channel 54 is alignable with the pair of holes 52. A pivot pin 56 is positioned through the pair of holes 52 and the channel 54 so that the tube 48 is pivotally coupled to the ring 38. A nut 58 that is threadedly coupled to a terminus 60 of the pivot pin 56 is configured to be loosened allow the tube 48 to be pivoted relative to the ring 38 and to be tightened to fixedly position the tube 48 relative to the ring 38.

In another embodiment of the invention, the cup 14 has a bottom 62 that is meshed. The bottom 62 is configured to filter particulates from a mixture that passes through the cup 14.

In use, the user grasps the rod 12 proximate to the second end 18 and positions the cup 14 in the source stream to collect the sample in the cup 14. The sample may be retained in the cup 14 by threadedly coupling the lid 46 to the cup 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A sample collection device comprising:
    a rod;
    a cup selectively couplable to a first end of the rod wherein the rod is configured for grasping, proximate to a second end, in a hand of a user positioning the user for positioning the cup in a source stream for collecting a sample, the cup being cylindrically shaped;
    a fastener coupled to the first end of the rod such that the fastener is positioned for selectively coupling to the cup for removably coupling the cup to the rod, the fastener comprising a ring;
    external threading positioned on the cup proximate to an upper end of the cup; and
    internal threading positioned in the ring, the internal threading being complementary to the external threading such that the ring is positioned for threadedly inserting the cup for removably coupling the cup to the ring.

2. The device of claim 1, further including the cup being substantially transparent.

3. The device of claim 2, further including indicia positioned on a wall of the cup wherein the indicia are configured for indicating a volume of the sample within the cup.

4. The device of claim 1, further comprising:
    the rod comprising a first section selectively couplable to a second section, the second section being tubular;
    a power module coupled to and positioned in the second section of the rod;
    a bulb coupled to the rod proximate to the first end, the bulb being operationally coupled to the power module such that the power module is positioned for selectively powering the bulb wherein the bulb is configured for illuminating an area proximate to the cup; and
    a switch coupled to the first section of the rod proximate to the second section, the switch being operationally coupled to the power module and the bulb wherein the switch is configured for selectively switching for operationally coupling the bulb to the power module for illuminating the area proximate to the cup.

5. The device of claim 4, further including the power module comprising a battery.

6. The device of claim 4, further including the bulb comprising a light emitting diode.

7. The device of claim 4, further including the switch being push button type.

8. The device of claim 1, further including a lid selectively threadedly couplable to the upper end of the cup for sealably enclosing the sample within the cup.

9. The device of claim 8, further including the ring being pivotally coupled to the rod wherein the rod is configured for pivoting relative to the ring such that the cup is selectively positionable for collecting a sample from a source stream lower than and above the user.

10. The device of claim 9, further comprising:
    the rod being externally threaded adjacent to the first end; and
    a tube pivotally coupled to and extending from the ring, the tube being internally threaded such that the tube is positioned for threadedly inserting the first end of the rod for removably coupling the rod to the ring.

11. The device of claim 10, further including a pair of tabs coupled to and extending from the ring;
    a pair of holes, each hole being positioned in a respective tab;
    a channel extending through the tube such that the channel is alignable with the pair of holes;
    a pivot pin positioned through the pair of holes and the channel such that the tube is pivotally coupled to the ring; and
    a nut threadedly coupled to a terminus of the pivot pin wherein the nut is configured for loosening for pivoting the tube relative to the ring and for tightening for fixedly positioning the tube relative to the ring.

12. The device of claim 1, further including the cup having a bottom, the bottom being meshed wherein the bottom is configured for filtering particulates from a mixture passing through the cup.

13. A sample collection device comprising:
    a rod, the rod comprising a first section selectively couplable to a second section, the second section being tubular, the rod being externally threaded adjacent to a first end;

a cup selectively couplable to the first end of the rod wherein the rod is configured for grasping, proximate to a second end, in a hand of a user positioning the user for positioning the cup in a source stream for collecting a sample, the cup being cylindrically shaped, the cup being substantially transparent;

a power module coupled to and positioned in the second section of the rod, the power module comprising a battery;

a bulb coupled to the rod proximate to the first end, the bulb being operationally coupled to the power module such that the power module is positioned for selectively powering the bulb wherein the bulb is configured for illuminating an area proximate to the cup, the bulb comprising a light emitting diode;

a switch coupled to the first section of the rod proximate to the second section, the switch being operationally coupled to the power module and the bulb wherein the switch is configured for selectively switching for operationally coupling the bulb to the power module for illuminating the area proximate to the cup, the switch being push button type;

indicia positioned on a wall of the cup wherein the indicia are configured for indicating a volume of the sample within the cup;

a fastener coupled to the first end of the rod such that the fastener is positioned for selectively coupling to the cup for removably coupling the cup to the rod, the fastener comprising a ring, the ring being pivotally coupled to the rod wherein the rod is configured for pivoting relative to the ring such that the cup is selectively positionable for collecting a sample from a source stream lower than and above the user;

external threading positioned on the cup proximate to an upper end of the cup;

internal threading positioned in the ring, the internal threading being complementary to the external threading such that the ring is positioned for threadedly inserting the cup for removably coupling the cup to the ring;

a lid selectively threadedly couplable to the upper end of the cup for sealably enclosing the sample within the cup;

a tube pivotally coupled to and extending from the ring, the tube being internally threaded such that the tube is positioned for threadedly inserting the first end of the rod for removably coupling the rod to the ring;

a pair of tabs coupled to and extending from the ring;

a pair of holes, each hole being positioned in a respective tab;

a channel extending through the tube such that the channel is alignable with the pair of holes;

a pivot pin positioned through the pair of holes and the channel such that the tube is pivotally coupled to the ring; and a nut threadedly coupled to a terminus of the pivot pin wherein the nut is configured for loosening for pivoting the tube relative to the ring and for tightening for fixedly positioning the tube relative to the ring.

14. The device of claim 13, further including the cup having a bottom, the bottom being meshed wherein the bottom is configured for filtering particulates from a mixture passing through the cup.

\* \* \* \* \*